United States Patent [19]

Akiyama et al.

[11] Patent Number: 5,229,336
[45] Date of Patent: Jul. 20, 1993

[54] METHOD OF PRODUCING OXYNITRIDE GLASS

[75] Inventors: Tomoyuki Akiyama; Koji Tsukuma, both of Tsuchiura, Japan

[73] Assignee: Tosoh Corporation, Shinnanyo, Japan

[21] Appl. No.: 766,220

[22] Filed: Sep. 27, 1991

[30] Foreign Application Priority Data

Sep. 28, 1990 [JP] Japan .................. 2-257463
Sep. 20, 1991 [JP] Japan .................. 3-268812

[51] Int. Cl.$^5$ ............................... C03C 3/11
[52] U.S. Cl. .......................... 501/56; 501/54; 501/97; 423/325
[58] Field of Search ............... 501/54, 56, 97; 423/325, 385

[56] References Cited

U.S. PATENT DOCUMENTS

3,149,946  9/1964  Elmer .
4,203,744  5/1980  Schultz et al. .
4,977,125  12/1990 Lednor .................. 501/97 X

FOREIGN PATENT DOCUMENTS

0288051  10/1988  European Pat. Off. .
0375548  6/1990   European Pat. Off. .
3-40929   2/1991   Japan .
3-109223  5/1991   Japan .

OTHER PUBLICATIONS

Journal of the American Ceramic Society, vol. 66, No. 11, Nov. 1983, pp. 758-764, C. J. Brinker, et al., "Oxynitride Glass Formation From Gels".
Journal of Non-Crystalline Solids, vol. 102, 1988, pp. 181-195, J. Schroeder, et al., "Nitrogen Doping of Fused Silica and Silicate Glasses: A Study of Transport and Optical Properties".
Function & Materials, vol. 1, 1989, pp. 42-50, S. Sakka, "New Process for Engineering Ceramics: Oxynitride Glass".
Patent Abstracts of Japan, vol. 12, No. 316 (C-524)(3163) Aug. 26, 1988, JP-A-63-85023, Fujikura Ltd.
C. Schrimpf et al, "Some Properties of Nitrogen-Containing $Na_2O$–$CaO$–$SiO_2$ Glasses", *Journal of Non-Crystalline Solids*, vol. 52 (1982) pp. 479–485.
M. Pauthe et al, "Preparation of oxynitride silicon glasses II. Bulk oxynitride glasses obtained by hot pressing", *Journal of Non-Crystalline Solids*, vol. 125, (1990) pp. 195–201.
R. Wusirika, "Reaction of Ammonia with Fumed Silica", *Journal of The American Ceramic Society*, vol. 73, No. 10, (1990), pp. 2926–2929.
European Search Report, EP 91 11 6572, Nov. 27, 1992.

*Primary Examiner*—Karl Group
*Attorney, Agent, or Firm*—Oblon, Spivak, McClelland, Maier & Neustadt

[57] ABSTRACT

The high-purity, heat-resistant oxynitride glass can be produced by subjecting a fine silica powder block to a nitriding treatment by heating it while keeping it in contact with an ammonia-containing gas in a reducing environment, which is achieved by at least one of the following means: (a) embedding the fine silica powder block in carbon powder, (b) placing the fine silica powder block in a carbon pipe or container, and (c) introducing a reducing gas, and simultaneously or subsequently sintering it.

6 Claims, No Drawings

METHOD OF PRODUCING OXYNITRIDE GLASS

BACKGROUND OF THE INVENTION

The present invention relates to a high-purity, heat-resistant oxynitride glass and a method of producing it, and more particularly to a method of producing oxynitride glass by using a block of fine silica powder (simply called "fine silica powder block") as a starting material and introducing it into an ammonia-containing gas at 800° C. or higher in a reducing environment.

In the field of a semiconductor industry, semiconductors are subjected to a heat treatment such as doping, etc. In such a heat treatment process, high-purity, heat-resistant materials, which do not dissipate impurities even by heating, and which are not deteriorated at an operating temperature, are desired as supporting members for semiconductors.

For this purpose, silica glass produced by melting quartz powder is now utilized. However, impurities such as metals, etc. included in the starting quartz powder material tend to remain in the glass even after a purification process. Accordingly, the impurities such as metals are likely to be dissipated by diffusion from the supporting members made of the silica glass during the heat treatment process of semiconductors. Synthetic silica glass has a higher purity than the silica glass obtained by a melting method, but the synthetic silica glass is poor in heat resistance as compared to the silica glass obtained by a melting method, due to the influence of hydroxyl groups introduced at the time of synthesis of the silica glass. Thus, there is now no silica glass satisfying the requirements of both purity and heat resistance.

As glass excellent in purity and heat resistance, there is oxynitride glass, part of whose oxygen atoms are substituted by nitrogen atoms. It is known that the oxynitride glass has good mechanical properties, chemical properties, thermal properties, etc., and active research is now conducted on the improvement of the oxynitride glass.

Methods of producing oxynitride glass which have been reported so far include a method of blowing an ammonia gas into a molten glass, a method of melting a mixture of silicon nitride and a glass material. However, when silica glass is used as a glass starting material to obtain a high-purity oxynitride glass, it is necessary to carry out a nitriding treatment of the glass starting material at an extremely high temperature, which means that it is disadvantageous in terms of costs. Also, there is reported a method of producing oxynitride glass by subjecting Vycor glass or a dry gel obtained by a sol-gel method to an ammonia gas treatment. In this case, the resulting oxynitride glass suffers from the generation of pores.

OBJECT AND SUMMARY OF THE INVENTION

Accordingly, an object of the present invention is to provide a high-purity, heat-resistant oxynitride glass.

Another object of the present invention is to provide a method of producing a high-purity, high-heat resistance oxynitride glass at a temperature of its melting point or lower.

As a result of intense research in view of the above objects, the inventors have found that by heating a fine silica powder block while bringing it into contact with an ammonia-containing gas in a reducing environment and sintering it, a high-purity, high-heat resistance oxynitride glass can be obtained. The present invention has been completed based upon this finding.

Thus, the oxynitride glass according to the present invention has a nitrogen content of 5,000-10,000 ppm, a viscosity coefficient of $10^{12}$ poise or more and a Young's modulus of about 73 GPa or more.

The method of producing oxynitride glass according to the present invention comprises the steps of subjecting a fine silica powder block to a nitriding treatment by heating it while keeping it in contact with an ammonia-containing gas in a reducing environment, and simultaneously or subsequently sintering it.

DETAILED DESCRIPTION OF THE INVENTION

In the production of oxynitride glass according to the present invention, a block of fine silica powder is used as a starting material. The fine silica powder block can be produced by a soot method, a sol-gel method, a powder molding method, etc., and has such a structure that an ammonia gas can be diffused thereinto, and that in its glassification process, an unreacted ammonia gas and a nitrogen gas generated by the decomposition of an ammonia gas do not remain as pores in the resulting silica glass. Such a fine silica powder block preferably has a bulk density of 11-41%, more preferably 13-36%, based on its theoretical density. When the bulk density is lower than 11%, the fine silica powder block cannot keep its shape during the heat treatment. On the other hand, when the bulk density is higher than 41%, the nitriding treatment of the fine silica powder cannot be easily carried out, and the resulting oxynitride glass is likely to have many pores.

Such a fine silica powder block includes a block obtained by accumulating fine silica powder prepared by a flame hydrolysis, and a molded body of fine silica powder. Particularly to obtain a pore-free oxynitride glass, it is preferable to utilize a fine silica powder having a specific surface area of 5-500 $m^2/g$. The flame hydrolysis can be carried out, for instance, by introducing vaporized silicon tetrachloride into an oxyhydrogen flame and hydrolyzing it to provide fine silica powder. The resulting fine silica powder is accumulated on a rotating target, etc. The fine silica powder obtained by the flame hydrolysis is generally in an amorphous state. Also, the molded body of the fine silica powder can be obtained by a die-molding method, a cold isostatic pressing method (CIP method), etc. With respect to an average particle size of the fine silica powder, it is not particularly restricted, but it is preferably about 0.1-30 μm.

By carrying out the heat treatment of the fine silica powder block while keeping it in contact with the an ammonia-containing gas, O in the $SiO_2$ network of the fine silica powder is substituted by N. Specific examples of the ammonia-containing gas include an ammonia gas itself, a mixed gas of an ammonia gas and nitrogen or an inert gas such as helium, argon, etc.

Since O in the fine silica powder cannot be easily substituted by N when only a nitrogen gas is used, the ammonia-containing gas is used in the present invention. The ammonia-containing gas has advantages that it has a high purity and that $H_2$, $H_2O$, etc. generated as decomposition products of ammonia are easily removed from the reaction system. The ammonia-containing gas preferably contains 1% or more of ammonia. When the ammonia content is lower than 1%, efficient nitriding cannot be achieved.

Although the substitution of O with N takes place at a temperature of about 800° C. or higher, but the concentration of nitrogen introduced by this substitution reaction is low and the gradient of its concentration is extremely large after the completion of glassification. Accordingly, it is preferred that the treatment of the fine silica powder block with the ammonia-containing gas is carried out before the completion of the glassification. Incidentally, as long as the nitriding treatment is carried out by contact with an ammonia-containing gas at a temperature of 800° C. or higher in the nitrogen substitution process, glassification can be carried out without changing the atmosphere, or by changing the atmosphere to other gas.

Taking into consideration influences on mechanical properties, thermal properties, chemical properties, etc., the concentration of nitrogen introduced by the substitution reaction is preferably 500 ppm or more. To provide the oxynitride glass with a heat resistance higher than that of the presently utilized melt-type silica glass, the nitrogen concentration is preferably 5000 ppm or more. Incidentally, the upper limit of the nitrogen concentration is preferably about 20,000 ppm.

Although a nitrogen substitution reaction takes place simply by exposing the fine silica powder block introduced into a pipe or container made of alumina, silica glass, etc. to an ammonia atmosphere, the reactivity of ammonia with the fine silica powder block is low, so that ammonia not consumed by the substitution reaction remains in the fine silica powder block in a molecule state. Accordingly, pores are generated after sintering. To solve this problem, the fine silica powder block is placed in a reducing environment in the nitrogen substitution process. By this, the reactivity of ammonia with silica powder is enhanced, making sure the substitution of the oxygen atoms in the silica networks with nitrogen atoms. Further, it is possible to prevent the generation of pores during the heating and/or sintering process.

The reducing environment can be achieved by various means such as a pressure reduction method, etc., but to put the overall fine silica powder block in a reducing atmosphere and to obtain the effect of accelerating the substitution reaction of oxygen atoms with nitrogen atoms, it is preferable to utilize at least one of the following means:

(a) embedding the fine silica powder block in carbon powder,
(b) placing the fine silica powder block in a carbon pipe or container, and
(c) introducing a reducing gas such as carbon monoxide, hydrogen, etc.

In the case of (c), the content of the reducing gas in the nitriding treatment gas is preferably 1-99%. In this case, the ammonia content in the nitriding treatment atmosphere is 99-1%.

With respect to the temperature of the nitrogen substitution reaction, it is preferably as high as possible as long as the fine silica powder block is not melted. Specifically speaking, it is preferably 800° C. or higher. When it is lower than 800° C., sufficient nitrogen substitution reaction does not take place. On the other hand, when it exceeds its melting point, the melting of the fine silica powder block takes place, leading to disadvantage in cost. In the above temperature range, the reaction time is 1 hour or more. Incidentally, when the nitrogen substitution reaction takes place at the same time of sintering, it is preferably 1400°-1700° C. for 1 hour or more.

The nitrogen-substituted fine silica powder block (fine silica powder block of oxynitride glass) is preferably sintered (glassified) in the same atmosphere as in the nitrogen substitution reaction process or in a gas such as an inert gas such as helium, argon, etc. or nitrogen, etc. The sintering and the nitrogen substitution reaction can be carried out simultaneously. The sintering method may be a pressureless sintering method, a pressurized sintering method, etc. with various modifications, and it may be followed by which a hot isostatic pressing method (HIP method), etc. Particularly to avoid pores from remaining in the sintered glass, it is preferable to utilize a so-called "zone-sintering method," by which a sample is glassified continuously from one end by moving either one of a heater or a sample to be heated in one direction.

The temperature of sintering conducted after the nitrogen substitution reaction is preferably 1400° C. or higher, particularly 1450°-1700° C. When the sintering temperature is lower than 1400° C., the resulting oxynitride glass block is not provided with a sufficient density. The sintering time in this case is preferably 1 hour or more.

In the method of the present invention, the heating of the fine silica powder block is carried out while bringing it into contact with an ammonia-containing gas in a reducing environment, so that a high-purity oxynitride glass having an extremely high heat resistance can be obtained. This oxynitride glass has as high a Young's modulus as about 73 GPa or more, particularly 73.5 GPa or more.

The present invention will be explained in further detail by way of the following Examples without intention of restricting the present invention thereto.

EXAMPLE 1

A block of fine silica powder produced from silicon tetrachloride by a flame hydrolysis, which had a bulk density of 14% and a specific surface area of 12 m$^2$/g, was used as a starting material. This fine silica powder block was placed on a quartz boat in such a manner that graphite powder (passed through 100-$\mu$m mesh) was in contact with the overall body of the fine silica powder block, and set in a quartz pipe. While introducing a mixed gas of ammonia and helium (ammonia: 24% by volume) into this quartz pipe, the nitrogen substitution reaction of the fine silica powder block was conducted at 1000° C. for 1 hour. Thereafter, the atmosphere was changed to a helium gas, and the nitrogen-substituted fine silica powder block (oxynitride glass) was sintered at 1540° C. for 1 hour to produce a transparent, pore-free oxynitride glass block.

EXAMPLE 2

A fine silica powder block prepared in the same manner as in Example 1 was used as a starting material. This fine silica powder block was placed on a quartz boat in such a manner that graphite powder (passed through 100-$\mu$m mesh) was in contact with the overall body of the fine silica powder block, and set in a quartz pipe. While introducing a mixed gas of ammonia and helium (ammonia: 14% by volume) into this quartz pipe, the nitrogen substitution reaction and sintering of the fine silica powder block was conducted at 1540° C. for 1 hour to produce a transparent, pore-free oxynitride glass block.

EXAMPLE 3

Tetraethoxysilane was hydrolyzed by mixing it with ethanol, pure water and an ammonia water, and filtered, dried and then baked at 800° C. in an oxygen stream to obtain fine silica powder (specific surface area: 50 m$^2$/g). The fine silica powder thus obtained and pure water were mixed at a weight ratio of 10:1, and the resulting slurry was filtered by a suction filtration method. The filtration was conducted until the surface of the resulting cake lost water, and the cake was dried. It was then subjected to cold isostatic pressing at a pressure of 0.5 t. The molded body of the fine silica powder had a bulk density of 0.8 g/cm$^3$ (36% of theoretical density).

This molded body was placed on a quartz boat in such a manner that graphite powder (passed through 100-μm mesh) was in contact with the overall body of the fine silica powder block, and set in a quartz pipe. While introducing a mixed gas of ammonia and helium (ammonia: 14% by volume) into this quartz pipe, the nitrogen substitution reaction of the fine silica powder block was conducted at 800° C. for 1 hour. Thereafter, the atmosphere was changed to a helium gas, and the nitrogen-substituted fine silica powder block (oxynitride glass) was sintered at 1540° C. for 1 hour to produce a transparent, pore-free oxynitride glass block.

EXAMPLE 4

A molded body of fine silica powder prepared in the same manner as in Example 3 was placed on a quartz boat in such a manner that graphite powder (passed through 100-μm mesh) was in contact with the overall body of the fine silica powder block, and set in a quartz pipe. While introducing a mixed gas of ammonia and helium (ammonia: 14% by volume) into this quartz pipe, the nitrogen substitution reaction of the fine silica powder block was conducted at 1000° C. for 1 hour. Thereafter, the atmosphere was changed to a helium gas, and the nitrogen-substituted fine silica powder block (oxynitride glass) was sintered at 1540° C. for 1 hour to produce a transparent, pore-free oxynitride glass block.

EXAMPLE 5

A fine silica powder block produced from silicon tetrachloride by a flame hydrolysis, which had a bulk density of 22% and a specific surface area of fine powder of 10 m$^2$/g, was used as a starting material. This fine silica powder block was placed on a quartz boat, and set in a graphite pipe. While introducing a mixed gas of ammonia and nitrogen (ammonia: 50% by volume) into this graphite pipe, the nitrogen substitution reaction of the fine silica powder block was conducted at 800° C. for 20 hours. Thereafter, the atmosphere was changed to a helium gas, and the nitrogen-substituted fine silica powder block (oxynitride glass) was sintered at 1550° C. for 1 hour to produce a transparent, pore-free oxynitride glass block.

EXAMPLE 6

A fine silica powder block prepared in the same manner as in Example 5 was placed on a carbon boat, and set in an alumina pipe. While introducing a mixed gas of ammonia and nitrogen (ammonia: 50% by volume) into this alumina pipe, the nitrogen substitution reaction of the fine silica powder block was conducted at 800° C. for 36 hours, while moving the sample in one direction in an electric furnace. Thereafter, the atmosphere was changed to a helium gas, and the temperature of the electric furnace was elevated to 1550° C. The sample was again introduced into the electric furnace at a constant velocity of 5 mm/min. Thus, the sample was glassified continuously from one end, so that a pore-free, transparent oxynitride glass block was obtained.

EXAMPLE 7

A fine silica powder block prepared in the same manner as in Example 5 was placed on a carbon boat, and set in a graphite pipe. While introducing a mixed gas of ammonia, hydrogen and nitrogen (ammonia: 50% by volume, hydrogen: 14% by volume and nitrogen: 36% by volume) into this graphite pipe, the nitrogen substitution reaction of the fine silica powder block was conducted at 800° C. for 2 hours. Thereafter, the atmosphere was changed to a helium gas, and the sample was sintered at 1500° C. for 1 hour, so that a pore-free, transparent oxynitride glass block was obtained.

EXAMPLE 8

A fine silica powder block produced from silicon tetrachloride by a flame hydrolysis, which had a bulk density of 14% and a specific surface area of fine powder of 12 m$^2$/g, was used as a starting material. This fine silica powder block was placed on a graphite boat, and set in a graphite pipe. While introducing a mixed gas of ammonia and nitrogen (ammonia: 50% by volume) into this graphite pipe, the nitrogen substitution reaction of the fine silica powder block was conducted at 800° C. for 36 hours. Thereafter, the atmosphere was changed to a helium gas, and the nitrogen-substituted fine silica powder block (oxynitride glass) was sintered at 1500° C. for 1 hour to produce a transparent, pore-free oxynitride glass block.

EXAMPLE 9

A fine silica powder block prepared in the same manner as in Example 8 was placed on a graphite boat, and set in a graphite pipe. While introducing ammonia into this graphite pipe, the nitrogen substitution reaction of the fine silica powder block was conducted at 800° C. for 2 hours. Thereafter, the atmosphere was changed to a helium gas, and the sample was sintered at 1550° C. for 1 hour, so that a pore-free, transparent oxynitride glass block was obtained.

COMPARATIVE EXAMPLE 1

A block of fine silica powder produced from silicon tetrachloride by a flame hydrolysis, which had a bulk density of 22% and a specific surface area of fine powder of 10 m$^2$/g, was used as a starting material. This fine silica powder block was placed on a quartz boat, and set in a quartz pipe. While introducing a mixed gas of chlorine and helium (chlorine: 14% by volume) into this quartz pipe, the fine silica powder block was heat-treated at 1000° C. for 1 hour. Thereafter, the atmosphere was changed to a helium gas, and the treated fine silica powder block was glassified at 1540° C.

COMPARATIVE EXAMPLE 2

A block of fine silica powder produced from silicon tetrachloride by a flame hydrolysis was used as a starting material. This fine silica powder block was placed on a quartz boat, and set in a quartz pipe. While introducing a mixed gas of chlorine and helium (chlorine: 14% by volume) into this quartz pipe, the fine silica powder block was glassified at 1540° C.

With respect to each of the oxynitride glass blocks obtained in the above Examples and Comparative Examples, the quantitative analysis of a nitrogen content and the measurement of a viscosity coefficient at 1300° C. by a beam-bending method were conducted. The results are shown in Table 1.

COMPARATIVE EXAMPLE 3

A fine silica powder block prepared in the same manner as in Example 9 was placed on a quartz boat, and set in a quartz pipe. While introducing ammonia into this quartz pipe, the nitrogen substitution reaction of the fine silica powder block was conducted at 800° C. for 2 hours. Thereafter, the atmosphere was changed to a helium gas, and the sample was sintered at 1550° C. for 1 hour, so that an oxynitride glass block was obtained.

TABLE 1

| Sample No. | Nitrogen Content (Weight %) | Viscosity Coefficient (Poise) | Young's Modulus (GPa) |
|---|---|---|---|
| Example 1 | 0.34 | $1.68 \times 10^{11}$ | 74.5 |
| Example 2 | 0.33 | $1.63 \times 10^{11}$ | 74.5 |
| Example 3 | 0.08 | $3.96 \times 10^{10}$ | 72.8 |
| Example 4 | 0.15 | $7.43 \times 10^{10}$ | 73.3 |
| Example 5 | 0.45 | $7.07 \times 10^{10}$ | 75.2 |
| Example 6 | 0.53 | $8.32 \times 10^{11}$ | 75.8 |
| Example 7 | 0.40 | $6.94 \times 10^{11}$ | 74.9 |
| Example 8 | 0.60 | $1.02 \times 10^{12}$ | 76.2 |
| Example 9 | 0.42 | $7.00 \times 10^{11}$ | 75.0 |
| Comparative Example 1 | 0 | $2.63 \times 10^{10}$ | 72.3 |
| Comparative Example 2 | 0 | $2.02 \times 10^{10}$ | 72.3 |
| Comparative Example 3 | 0.02 | $3.00 \times 10^{10}$ | 72.4 |

As is clear from Table 1, by substituting oxygen atoms of the fine silica powder block with nitrogen atoms in a reducing environment, the oxynitride glass block having a high nitrogen content and a high viscosity coefficient at a high temperature (namely, high heat resistance) were obtained. The oxynitride glass of the present invention showed a high modulus expressed by a Young's modulus of 73 GPa or more, particularly 73.5 GPa or more.

As described above in detail, by the method of the present invention, it is possible to produce oxynitride glass having a high viscosity at a high temperature (meaning excellent heat resistance) and a high purity.

What is claimed is:

1. A method of producing oxynitride glass comprising the steps of subjecting a fine silica powder block to a nitriding treatment by heating it while keeping it in contact with an ammonia-containing gas in a reducing environment, and simultaneously or subsequently sintering it, said reducing environment being achieved by at least one of the following means:
   (a) embedding said fine silica powder block in carbon powder, and
   (b) placing said fine silica powder block in a carbon pipe or container.

2. The method of producing oxynitride glass according to claim 1, wherein the contact of said fine silica powder block with said ammonia-containing gas is conducted at a temperature of 800° C. or higher, thereby doping said fine silica powder block with 500 ppm or more of nitrogen.

3. The method of producing oxynitride glass according to claim 1, wherein said ammonia-containing gas is an ammonia gas, or a mixed gas of ammonia and nitrogen or an inert gas.

4. The method of producing oxynitride glass according to claim 1, wherein said fine silica powder block is a block obtained by accumulating fine silica powder produced by a flame hydrolysis, or a molded body of the fine silica powder.

5. The method of producing oxynitride glass according to claim 1, wherein said fine silica powder block has a bulk density of 11–41%, based on its theoretical density.

6. The method of producing oxynitride glass according to claim 1, wherein said fine silica powder block has a specific surface area of 5–500 m²/g.

* * * * *